United States Patent
Higgins et al.

(10) Patent No.: US 10,255,820 B2
(45) Date of Patent: Apr. 9, 2019

(54) SYSTEMS AND METHODS FOR EVALUATING SUSCEPTIBILITY OF AUTOMATED SCORING ENGINES TO GAMING BEHAVIOR

(71) Applicant: Educational Testing Service, Princeton, NJ (US)

(72) Inventors: Derrick Higgins, Philadelphia, PA (US); Isaac Bejar, Hamilton, NJ (US); Michael Heilman, Princeton, NJ (US); Yoko Futagi, Lawrenceville, NJ (US); Michael Flor, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 164 days.

(21) Appl. No.: 14/226,318

(22) Filed: Mar. 26, 2014

(65) Prior Publication Data

US 2014/0295399 A1 Oct. 2, 2014

Related U.S. Application Data

(60) Provisional application No. 61/805,647, filed on Mar. 27, 2013.

(51) Int. Cl.
*G09B 7/00* (2006.01)
*G09B 7/02* (2006.01)

(52) U.S. Cl.
CPC .................................. *G09B 7/02* (2013.01)

(58) Field of Classification Search
USPC ........ 434/236, 238, 362, 322, 323, 350, 365
See application file for complete search history.

(56) References Cited

PUBLICATIONS

Attali, Yigal, Bridgeman, Brent, Trapani, Catherine; Performance of a Generic Approach in Automated Essay Scoring; Journal of Technology, Learning, and Assessment, 10(3); pp. 4-16; Aug. 2010.
Higgins, Derrick, Burstein, Jill, Attali, Yigal; Identifying Off-Topic Student Essays Without Topic-Specific Training Data; Natural Language Engineering, 12(2); pp. 145-159; 2006.
Powers, Donald, Burstein, Jill, Chodorow, Martin, Fowles, Mary, Kukich, Karen; Stumping E-Rater: Challenging the Validity of Automated Essay Scoring; GRE Board Professional Report No. 98-08bP, Educational Testing Service Research Report 01-03, Mar. 2001.
Williamson, David, Xi, Xiaoming, Breyer, F. Jay; A Framework for Evaluation and Use of Automated Scoring; Educational Measurement: Issues and Practice, 31(1); pp. 2-13; 2012.

*Primary Examiner* — Kesha Frisby
(74) *Attorney, Agent, or Firm* — Jones Day (57) ABSTRACT

Systems and methods are provided for determining a susceptibility of a computer-implemented automated scoring engine to gaming strategies. A plurality of responses to a prompt are provided to a computer-implemented automated scoring engine to receive a first set of scores. A first transformation is performed on each of the plurality of responses to generate a first set of transformed responses. The first set of transformed responses is provided to the computer-implemented automatic scoring engine to receive a second set of scores, and a gaming susceptibility metric is determined based on the first set of scores and the second set of scores.

21 Claims, 9 Drawing Sheets

| Task | JZ | | | | LT | | | | XC | | | |
|---|---|---|---|---|---|---|---|---|---|---|---|---|
| | Response Repeats | # Stimulus Words | # Academic Words | $T_{ASAP}$ | Response Repeats | # Stimulus Words | # Academic Words | $T_{ASAP}$ | Response Repeats | # Stimulus Words | # Academic Words | $T_{ASAP}$ |
| 1 | 2 | 30 | 30 | 0.65 | 2 | 30 | 30 | 0.23 | 0 | 15 | 30 | 0.08 |
| 2 | 0 | 30 | 0 | 0.27 | 1 | 30 | 30 | 0.15 | 1 | 30 | 15 | 0.39 |
| 3 | 2 | 30 | 30 | 0.65 | 2 | 30 | 30 | 0.46 | 0 | 30 | 30 | 0.42 |
| 4 | 0 | 30 | 30 | 1.34 | 2 | 30 | 5 | 0.80 | 1 | 30 | 30 | 0.72 |
| 5 | 0 | 30 | 30 | 0.30 | 2 | 30 | 30 | 0.12 | 1 | 15 | 30 | 0.04 |
| 6 | 1 | 30 | 30 | 0.22 | 2 | 30 | 30 | 0.07 | 0 | 0 | 30 | 0.05 |
| 7 | 1 | 30 | 30 | 0.76 | 1 | 30 | 30 | 0.52 | 1 | 30 | 30 | 0.33 |
| 8 | 0 | 30 | 30 | 1.22 | 2 | 30 | 30 | 0.29 | 2 | 30 | 15 | 0.19 |
| 9 | 1 | 30 | 30 | 1.19 | 2 | 30 | 30 | 0.67 | 1 | 30 | 30 | 0.49 |
| 10 | 1 | 30 | 30 | 1.13 | 2 | 30 | 30 | 0.89 | 1 | 30 | 30 | 0.74 |
| ALL | 1 | 30 | 30 | 0.71 | 2 | 30 | 30 | 0.41 | 1 | 30 | 30 | 0.34 |

FIG. 4

Δ Score as a function of number of times response is repeated, applying no other gaming strategies.

FIG. 5

Δ Score as a function of number of random words from item stimulus added, applying no other gaming strategies.

SYSTEMS AND METHODS FOR EVALUATING SUSCEPTIBILITY OF AUTOMATED SCORING ENGINES TO GAMING BEHAVIOR

CROSS-REFERENCE TO RELATED APPLICATIONS

The present application claims priority from U.S. Provisional Application Ser. No. 61/805,647 entitled "Evaluation of Automated Scoring Methods' Susceptibility to Gaming Strategies," filed 27 Mar. 2013, the entirety of which is hereby incorporated by reference.

FIELD

This disclosure is related generally to constructed response scoring and more particularly to evaluation of constructed response scoring engines.

BACKGROUND

Constructed response prompts request an open-ended type response, such as an essay response, that can demonstrate cognitive knowledge and reasoning. In contrast to more limited response type prompts (e.g., multiple choice prompts, true-false prompts), scoring of constructed responses tends to be more difficult and resource intensive. Traditionally, constructed responses have been scored by human scorers. In recent years, efforts have been made to automate the scoring of constructed responses. While such efforts can potentially reduce time and monetary costs, there is concern that test takers could receive inflated scores through "gaming" strategies, where constructed responses are adjusted in construct-irrelevant manners (i.e., in ways that do not improve upon the actual content of the response) with the goal of increasing scores provided by automated scoring engines.

SUMMARY

Systems and methods are provided for determining a susceptibility of a computer-implemented automated scoring engine to gaming strategies. A plurality of responses to a prompt are provided to a computer-implemented automated scoring engine to receive a first set of scores. A first transformation is performed on each of the plurality of responses to generate a first set of transformed responses. The first set of transformed responses is provided to the computer-implemented automatic scoring engine to receive a second set of scores, and a gaming susceptibility metric is determined based on the first set of scores and the second set of scores.

As another example, a computer-implemented system for determining a susceptibility of a computer-implemented automated scoring engine to gaming strategies includes a computer-readable medium encoded with a plurality of responses to a prompt. A transformation engine is configured to apply a transformation to each of the plurality of responses to generate a set of transformed responses. An automatic scoring engine is configured to receive the plurality of responses and to provide a first set of scores. The automatic scoring engine is further configured to receive the set of transformed responses and to provide a second set of scores. A score comparison module is configured to determine a gaming susceptibility metric based on the first set of scores and the second set of scores.

As a further example, a computer-readable medium is encoded with instructions for commanding one or more data processors to perform a method of determining a susceptibility of a computer-implemented automated scoring engine to gaming strategies. In the method, a plurality of responses to a prompt are provided to a computer-implemented automated scoring engine to receive a first set of scores. A first transformation is performed on each of the plurality of responses to generate a first set of transformed responses. The first set of transformed responses is provided to the computer-implemented automatic scoring engine to receive a second set of scores, and a gaming susceptibility metric is determined based on the first set of scores and the second set of scores.

DETAILED DESCRIPTION

As methods for automated scoring of constructed response items become more widely adopted and are used in more consequential operational configurations, it is desirable to investigate and manage their susceptibility to gaming behavior. Typically, automated scoring engines are evaluated based on how well scores assigned by the engines agree with scores assigned independently by human judges. While agreement with human scorers is important, it is also desirable that such scoring engines should not be susceptible to construct-irrelevant gaming strategies, by which test takers seek to inflate their scores without improving on the content of their responses.

Figure 1:
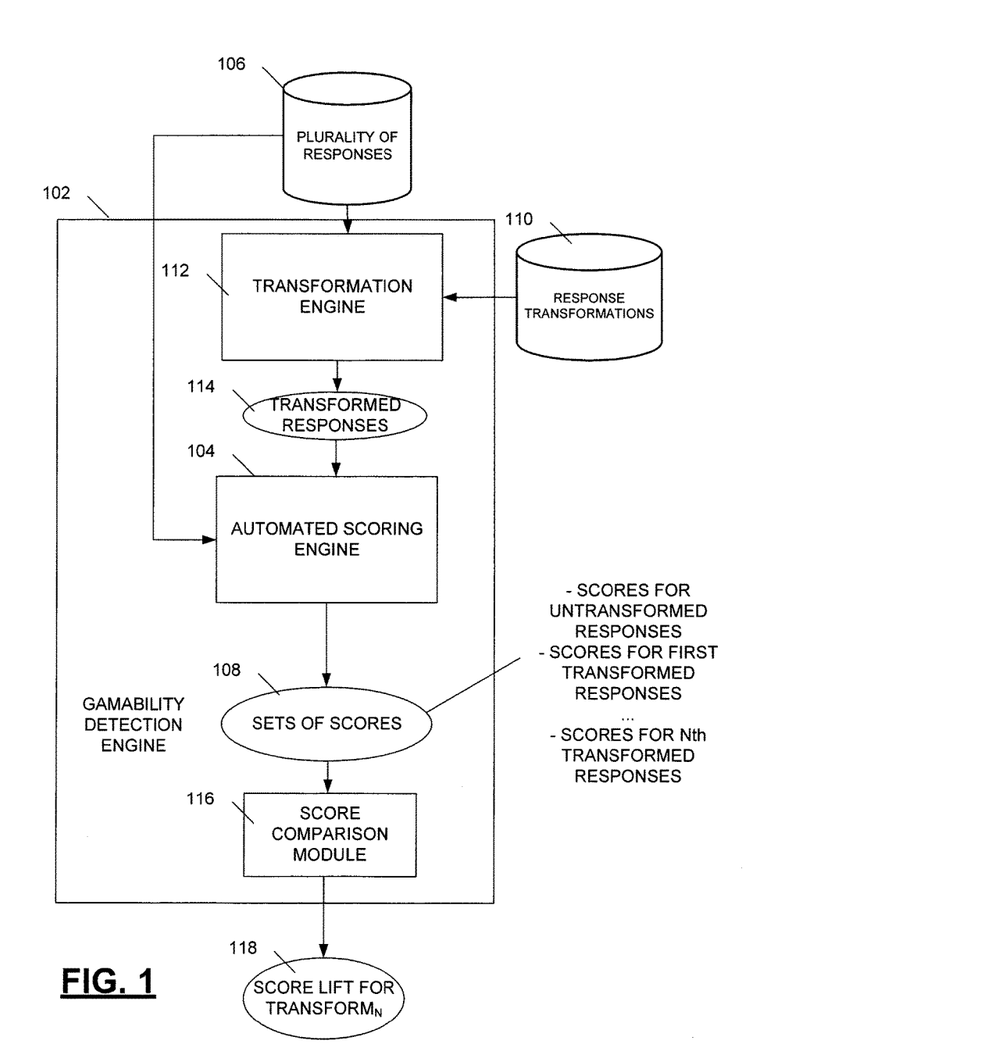
FIG. 1 is a block diagram depicting a system for determining a susceptibility of a computer-implemented automated scoring engine to gaming strategies.

FIG. 1 is a block diagram depicting a system for determining a susceptibility of a computer-implemented automated scoring engine to gaming strategies. The system can be implemented using any suitable combination of hardware, software, and/or firmware such that a processing system of a computer system is configured to carry out the exemplary approaches explained below. A gamability detection engine 102 is configured to measure the susceptibility of an automated scoring engine 104 (e.g., a scoring engine configured to score responses to a particular prompt, such as an essay prompt, a show your work math prompt, an architect drawing prompt) to one or more gaming strategies. The gamability detection engine 102 is configured to access a plurality of responses 106 to a prompt, such as from a computer-readable medium, and to provide those responses to the automated scoring engine to generate a first set of scores, that is outputted at 108. The first set of scores corresponds to scores for untransformed responses and identifies a baseline to which scores for responses that exhibit gaming strategies are compared.

The gamability detection engine 102 is also configured to access a set of response transformations 110. A response transformation 110 represents a gaming strategy that the automated scoring engine 104 is to be tested against; the set of response transformations 110 may be considered a set of candidate gaming strategies to be assessed. One exemplary type of gaming strategy may attempt to take advantage of the automated scoring engines with the goal of potentially providing higher scores to longer essays, and this gaming strategy may artificially inflate the length of the essay by repeating on-topic content multiple times and submitting the essay containing the repeated content as a test response. An example response transformation 110 to mimic this gaming strategy instructs a transformation engine 112 to take each of the plurality of responses 106 and repeat the content of those responses multiple times to generate a set of transformed responses 114 before submission to the automated scoring engine. The automated scoring engine 104 is then provided the transformed responses 114 (e.g., essays having response 106 content repeated multiple times) to the automated scoring engine to generate a second set of scores 108 associated with the transformed responses 114.

A score comparison module 116 compares the first set of scores associated with the untransformed responses 106 and the second set of scores associated with the transformed responses 114 to determine a gaming susceptibility metric 118 that indicates a susceptibility of the automated scoring engine 104 to the gaming strategy represented by the applied response transformation 110. Gaming susceptibility metrics 116 can take a variety of forms. For example, a gaming susceptibility metric 116 can be a score lift metric that indicates a change in the average score provided by the automated scoring engine 104 to the untransformed responses 106 and the average score provided for the transformed responses 114. If the average score provided for the transformed responses 114 is higher (e.g., more than a threshold amount higher, a statistically significant amount higher), then the automated scoring engine 104 may be susceptible to the gaming strategy represented by the applied response transformation 110. Such a susceptibility metric can be represented as $$\Gamma = \frac{1}{N}\left\{\sum_{i=1\ldots N} \text{Score}[(s_{m_0})(R_i)]\right\} - \frac{1}{N}\sum_{i=1\ldots N} \text{Score}(R_i);$$

Where $\Gamma$ represents the susceptibility metric, e.g., score lift (amount the score is raised by the gaming strategy), N is the total number of base responses 106 being scored, $R_i$ are the base responses 106, and $s_{m_0}$ represents transformation $m_0$ (e.g., repeat the base response 106 content 2 times) applied to each of the base responses, and Score is the score provided by the automated scoring engine for both the ith base response in one instance and for the "transformed" ith response in the transformed instance.

The process of transforming a set of responses to determine transformed response scores can be repeated as desired to analyze susceptibility of the automated scoring engine 104 to different gaming strategies. For each of the different gaming strategies, a different response transformation 110 is accessed and applied to the base responses 106, transformed responses 114 are provided to the automated scoring engine 104 to generate additional scores (e.g., a third set of scores corresponding to the second gaming strategy and corresponding second response transformation 110) for comparison to the first set of scores corresponding to the untransformed responses 106. Gaming susceptibility metrics 118 that are indicative of the effectiveness of the gaming strategy are generated based on the comparison of the sets of scores 108.

In one example, multiple response transformations 110 can be applied to a base response 106 before being scored by the automated scoring engine 104 to investigate the effectiveness of simultaneously applying multiple gaming strategies. As described above, one response transformation 110 directs the transformation engine 112 to generate each transformed response 114 by repeating the base response 106 a particular number of times. A second gaming strategy postulates that an automated scoring engine 104 may score responses higher if they contain words from the prompt (e.g., essay prompt) that elicits the responses 106. Because words copied from the prompt are likely on topic, the simple inclusion of those words into responses could increase scores, without any real contribution to the essay content. Thus, a second response transformation 110 selects a given number of words from the prompt and incorporates those words into the transformed response 114 (e.g., appends the prompt words at the end of a response, randomly inserts the prompt words within the response). In one example, to apply both response transformations 110 to a base response 106, the response transformations 110 direct the transformation engine 112 to repeat the base essay 106 n times and incorporate m words from the prompt into the transformed response.

The gamability detection engine 102 can thus be utilized to test the susceptibility of an automated scoring engine (e.g., scoring engine 104) to a variety of different gaming strategies, using associated response transformations, as well as combinations of gaming strategies. The gamability detection engine 102 can also be configured to apply different variations of gaming strategies, or combinations thereof. For example, for the base response repeating response transformation 110, for different cycles of the gamability detection engine 102, the base response 106 can be repeated different numbers of times (e.g., 2 times, 3 times, 4 times). Similarly, for the prompt word incorporation transformation 110, the transformation engine 112 can be instructed to incorporate different numbers of words from the prompt into the transformed response 114 to investigate the effectiveness of different amounts of prompt word incorporation.

In implementations where several different transformations are desired to be tested, alone and in combinations, with those transformations being applied using different parameters (e.g., a number of times to repeat the base response parameter, a number of prompt words to incorporate parameter), the number of cycles of the gamability detection engine to be run can become large. A gamability detection engine can be configured to automate the generation of the desired sets of transformations and associated parameters, scoring of those sets of transformed responses, and generating and analyzing gaming susceptibility metrics therefrom.

Figure 2:
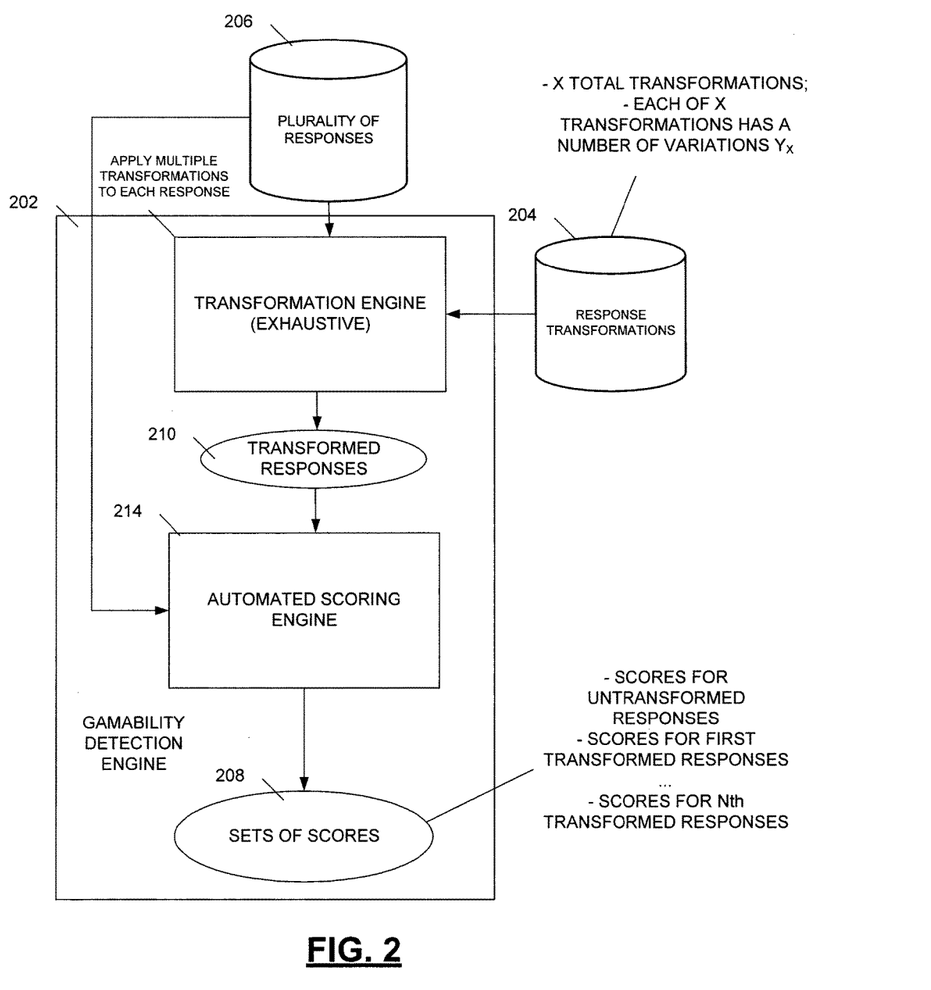
FIG. 2 is a block diagram depicting an automated gamability detection engine.

FIG. 2 is a block diagram depicting an automated gamability detection engine. The gamability detection engine 202 is provided a number of transformations 204 and variations thereof to apply to a set of responses 206. The gamability detection engine 202 runs a number of cycles to test each of the desired combinations. For example, where the gamability detection engine 202 is instructed to test the base response repeat transformation for 2 and 3 repeats and the prompt word incorporation transformation for 5 and 10 words, the gamability detection engine 202 of FIG. 2 is configured to perform an exhaustive analysis of all permutations of those transformations/parameters:

Repeat transformation with 2 repeats;
Repeat transformation with 3 repeats;
Prompt word incorporation of 5 words;
Prompt word incorporation of 10 words;
Repeat transformation with 2 repeats and prompt incorporation of 5 words;
Repeat transformation with 2 repeats and prompt incorporation of 10 words;
Repeat transformation with 3 repeats and prompt incorporation of 5 words;
Repeat transformation with 3 repeats and prompt incorporation of 10 words.

One set of scores 208 is generated for each of the permutations based on sets of transformed responses 210 generated to implement those permutations, and gaming susceptibility metrics are generated, such as based on comparisons of transformation permutation scores and scores generated for untransformed responses 206. Such gaming susceptibility metrics can be used, for example, to identify to which combinations of gaming strategies the automated scoring engine 212 is most vulnerable. The automated scoring engine 214, in one example, can then be adjusted to combat such gaming strategies. For example, where the automated scoring engine 214 is deemed vulnerable to strategies that artificially inflate the length of responses, the automated scoring engine 214 can be augmented to flag responses that are exceptionally long (e.g., more than 4 standard deviations from the average length) for further review or can provide those responses with low or zero scores.

In one example, where a gaming susceptibility metric is sought that indicates a most significant score lift provided by a combination of m transformations having $n_m$ parameters each can be computed as:

$$\Gamma = \frac{1}{N} \max_{\{\bar{n}, \bar{m}\}} \left\{ \sum_{i=1...N} \text{Score}[(s_{m_0}^{n_0} \circ s_{m_1}^{n_1} \circ \ldots )(R_i)] \right\} - \frac{1}{N} \sum_{i=1...N} \text{Score}(R_i);$$

Where $\Gamma$ represents the score lift, Ri represents the ith response of the plurality of responses, N represents the total number of responses in the plurality of responses, Score is the score provided by the automated scoring engine for both the ith response itself in one instance and for the "transformed" ith response in the transformed instance, and $s_c^B$ is an application of transformation c according to parameter b applied to each of the plurality of responses $R_i$, where scores are provided over all possible permutations of the m transformations having $n_m$ parameters. In this regard, the metric $\Gamma$ can provide a measure of an optimum combination of gaming strategies for improving test takers' scores so as to identify the optimum combination of gaming strategies that need to be guarded or defended against.

Figure 3:
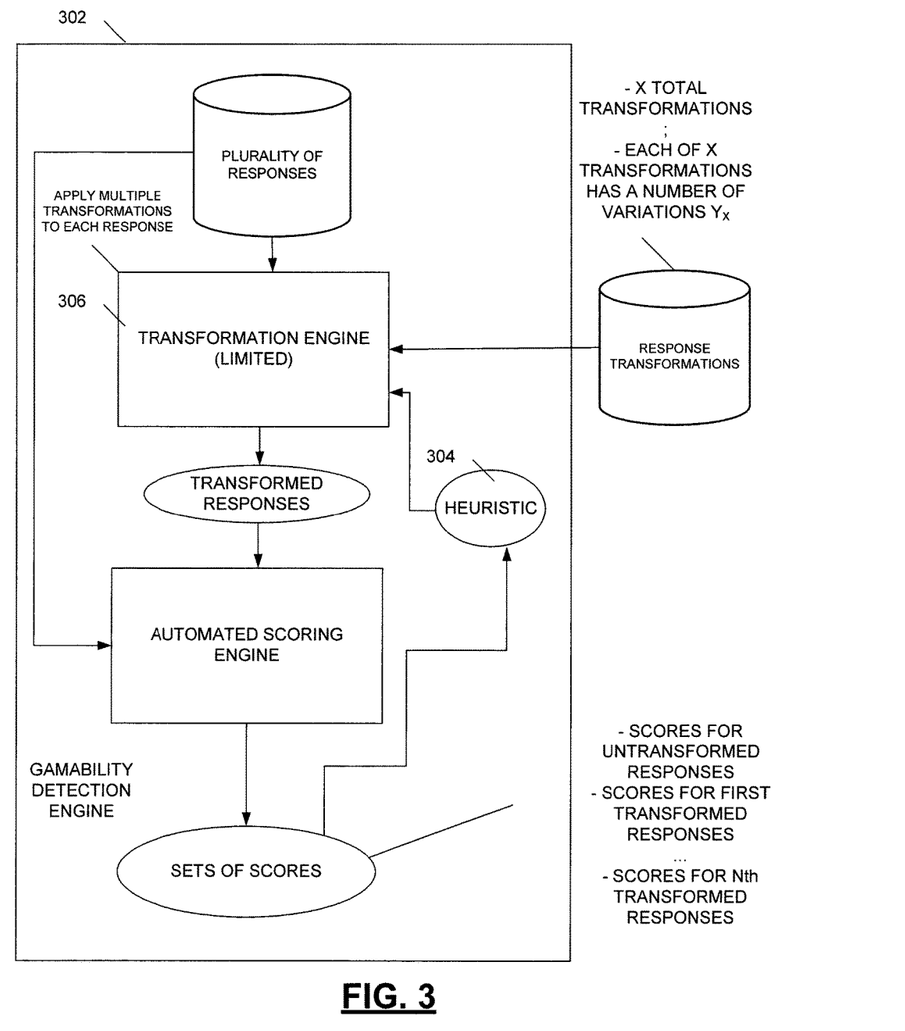
FIG. 3 is a block diagram depicting a gamability detection engine that utilizes a heuristic to limit transformation/transformation parameter permutations analyzed by the gamability detection engine.

The identification of an optimum combination of gaming strategies (or optimization analysis) can be carried out in a variety of ways. If the parameters space spanning all hypothesized gaming strategies, or those deemed to be most prevalent, is sufficiently small, then an exhaustive computation of all combinations of those strategies may be carried out. However, where the number of transformation permutations becomes very large, such as when a large number of transformations and transformation parameter variations are to be analyzed by a gamability detection engine in combination, processing time can become unacceptably long. In such cases, heuristic methods known to those of skill in the art can be used to identify a smaller parameters space for evaluation, e.g., such as greedy search, beam search, genetic algorithms, and simulated annealing, for instance. FIG. 3 is a block diagram depicting a gamability detection engine that utilizes a heuristic in one example to limit transformation/transformation parameter permutations analyzed by the gamability detection engine. The gamability detection engine 302 includes a heuristic 304 that in some cases will instruct the transformation engine 306 not to perform a transformation-scoring cycle for certain transformation/transformation parameter permutations. Such limitations may be beneficial where the number of transformations and transformation parameters thereof becomes large. For example, where a first transformation has seven possible parameter states, a second transformation has 5 parameter states, and a third transformation has six parameter states, over 200 cycles need to be performed to examine each permutation. The heuristic 304 can be configured to avoid cycles that are unlikely to uncover combinations of gaming strategies that are more successful than those previously uncovered.

In one example, the heuristic uses a bounding criterion to limit cycles. Where one of the transformations is the base response repeat transformation to be analyzed for 1-7 repetitions of the base response, and where for one combination of that transformation with permutations of the second and third transformations the gaming susceptibility metric indicates a decrease in scores for 4 repetitions over 3 repetitions, the heuristic can instruct the transformation engine 306 not to perform cycles for 5, 6, and 7 repetitions, because such permutations are not likely to increase scores more than the maximum discovered at 3 repetitions. By pruning cycles from various branches of transformation/transformation parameter permutations based on one or more heuristic criteria, processing time can be substantially reduced.

In addition to the base response repetition and prompt word incorporation transformations, many other example transformations can be utilized. In one example, a transformation seeks to replace one or more (e.g., based on a transformation parameter) words of a base response to use a synonym that might be scored higher by an automated scoring engine. In one example, synonyms are selected that are longer in length (e.g., the synonym that contains the most letters) to imply a more sophisticated vocabulary. In another example, a synonym is selected that is infrequently used in an attempt to imply a more sophisticated vocabulary (e.g., the synonym that is identified as being least frequently used according to a word frequency reference, such as a Standardized Frequency Index). In another example, a transformation inserts one or more words that are considered "academic" in nature (e.g., from an academic word list) into a base response, again to imply sophisticated vocabulary, strong analytical ability, or other trait thought to be deemed desirable by an automated scoring engine.

Figure 4:
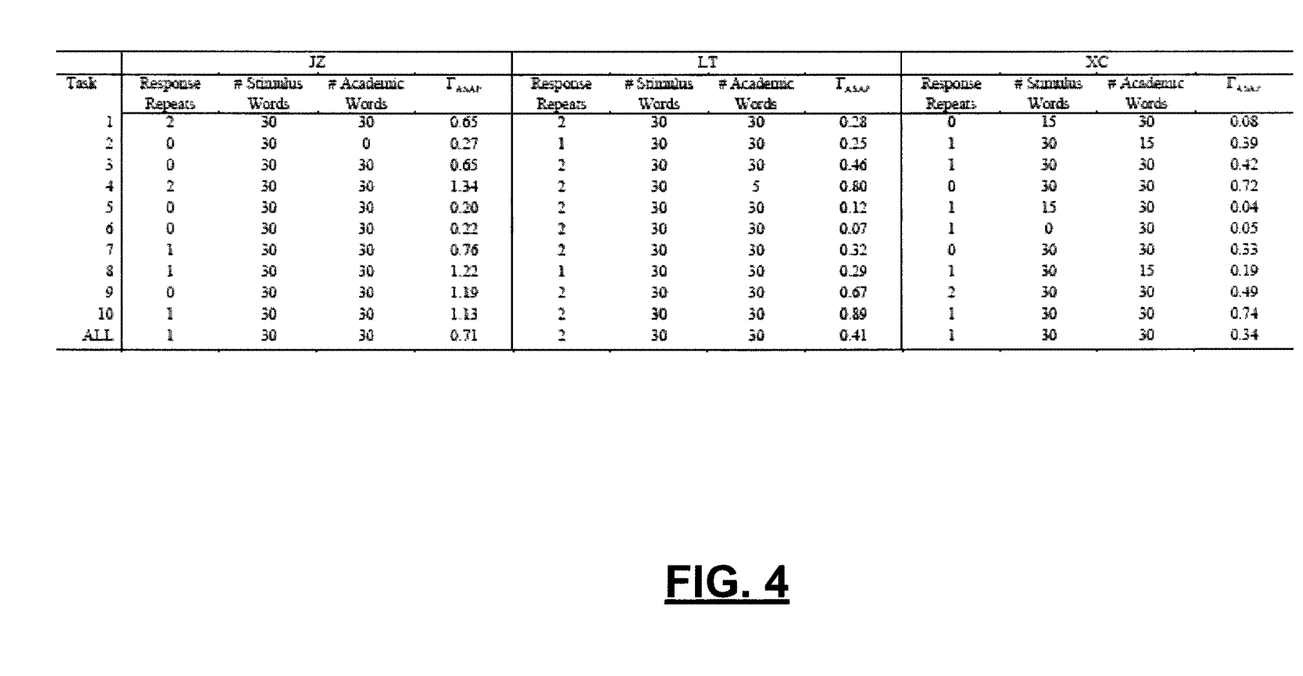
FIG. 4 is a chart depicting example results of processing by a gamability detection engine.

FIG. 4 is a chart depicting example results of processing by a gamability detection engine. In the example of FIG. 4, three different automated scoring engines (JZ, LT, and XC) were examined for each of 10 prompts and associated responses. A first transformation repeated base responses 0, 1, or 2 times. A second transformation added 0, 15, or 30 words from the prompt to the base responses. A third transformation added 0, 5, 15, 20, 25, or 30 academic words to the base responses. Those transformations were applied alone and in combination, and the combinations that yielded the highest gaming susceptibility metric (indicating the highest average score lift over scoring of the base responses) for each prompt is displayed. Of note, the JZ automated scoring engine was identified as being particularly vulnerable to certain gaming strategies for prompts 4, 8, 9, and 10, where certain combinations of gaming strategies, as represented by the corresponding transformations, raised scores on average by more than 1 point.

Figure 5:
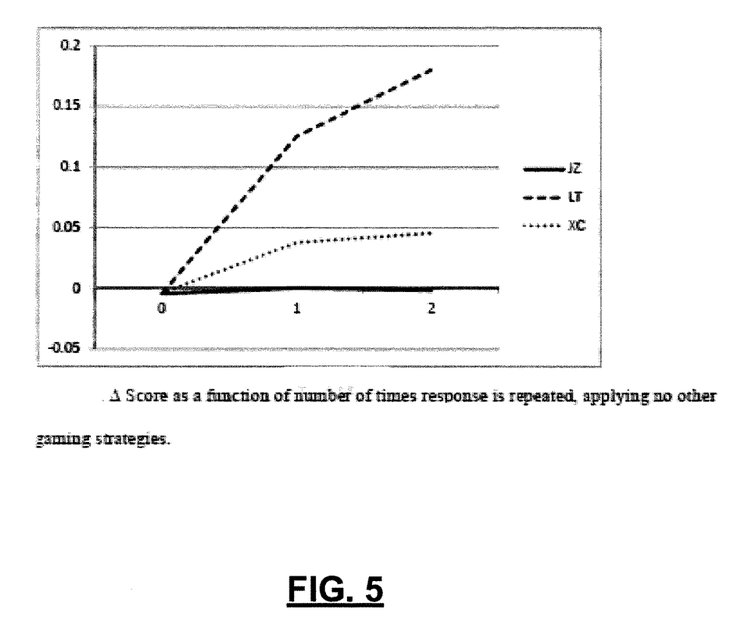
FIG. 5 is a chart depicting average changes in scores based on a number of times that a transformation repeats a base response in generating a transformed response per automated scoring engine.
Figure 6:
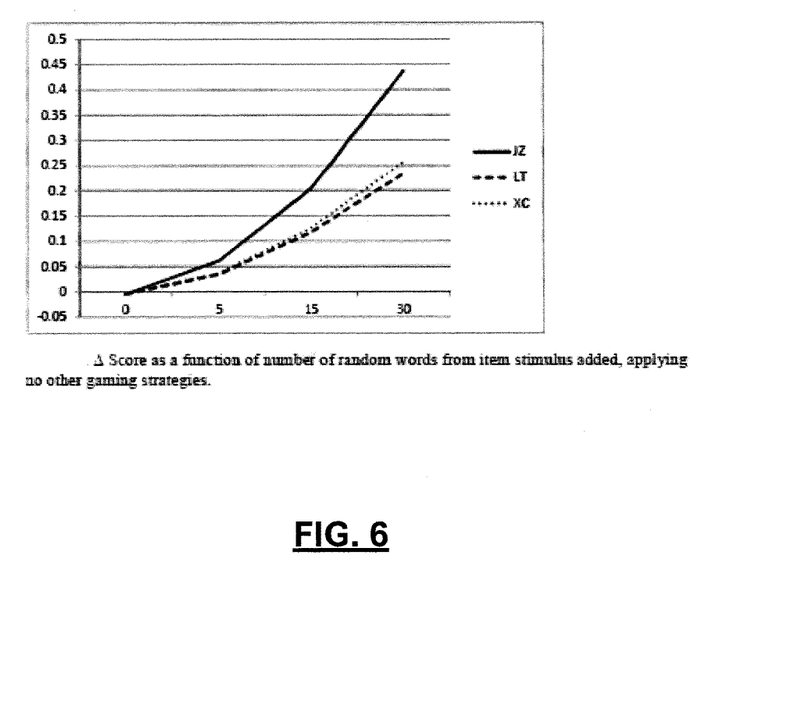
FIG. 6 is a chart depicting average changes in scores based on a number of random words from a prompt incorporated into base responses in generating a transformed response per automated scoring engine.

In addition to average score lift, examples of which are described above with respect to FIGS. 1 and 2, other metrics and data can be extracted through comparisons of score sets generated based on scoring of base responses and transformed responses. FIG. 5 is a chart depicting average changes in scores based on a number of times that a transformation repeats a base response in generating a transformed response per automated scoring engine. In the example of FIG. 5, the JZ model scores responses, on average, 0.18 points higher when the base response is repeated 2 extra times, where the other automated scoring engines are less susceptible to such gaming strategies. FIG. 6 is a chart depicting average changes in scores based on a number of random words from a prompt incorporated into base responses in generating a transformed response per automated scoring engine. All three of the scoring engines exhibited some susceptibility to this gaming strategy, where the JZ scoring engine exhibited the most vulnerability.

Figure 7:
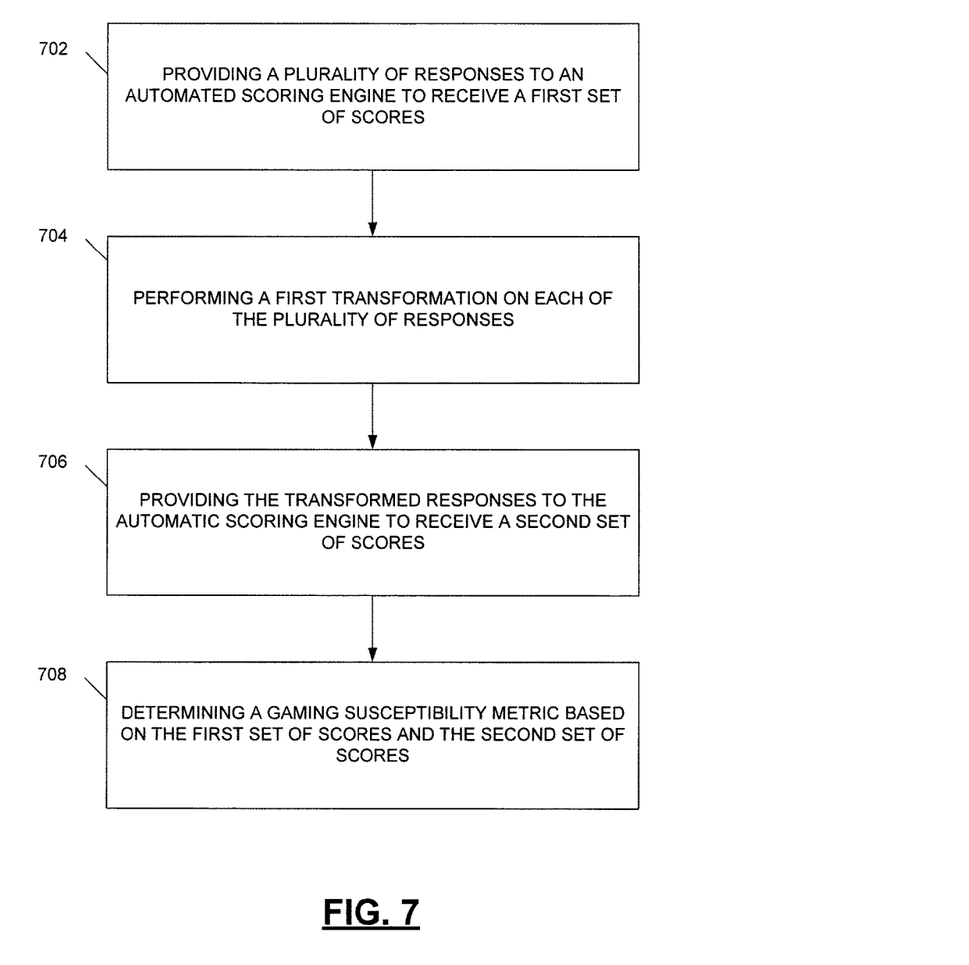
FIG. 7 is a flow diagram depicting a method of determining a susceptibility of a computer-implemented automated scoring engine to gaming strategies.

FIG. 7 is a flow diagram depicting a method of determining a susceptibility of a computer-implemented automated scoring engine to gaming strategies. At 702, a plurality of responses to a prompt are provided to a computer-implemented automated scoring engine to receive a first set of scores. At 704, a first transformation is performed on each of the plurality of responses to generate a first set of transformed responses. The first transformation represents application of a candidate gaming strategy whose impact on automated scoring is to be evaluated. At 706, the first set of transformed responses is provided to the computer-implemented automatic scoring engine to receive a second set of scores, and at 708, a gaming susceptibility metric is determined based on the first set of scores and the second set of scores. It will be appreciated that one or more additional transformations may be applied to the plurality of responses, wherein the one or more additional transformations represent other candidate gaming strategies whose impact on automated scoring are to be evaluated. Such transformations representative of various candidate gaming strategies may be applied singly to evaluate the impact of each gaming strategy in isolation, or multiple transformations representing different gaming strategies may be applied to a given response in combination to evaluate the combined impact of those multiple strategies.

Figure 8A:
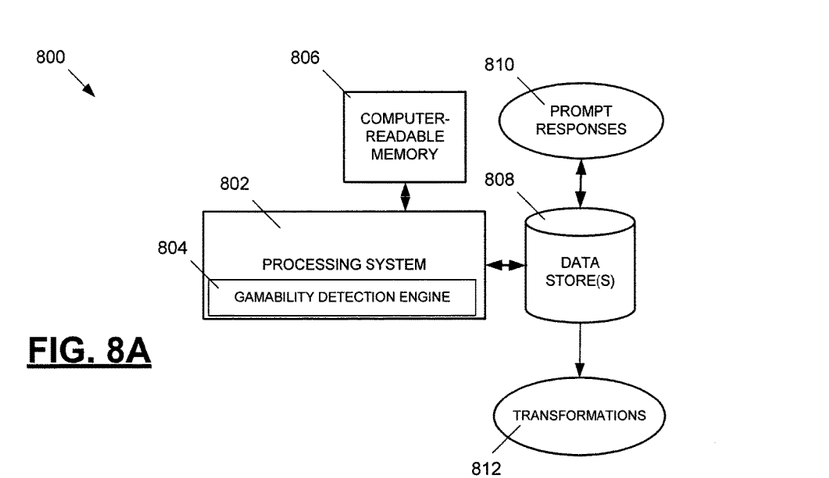
FIGS. 8A, 8B, and 8C depict example systems for use in implementing a gaming detection engine.
Figure 8B:
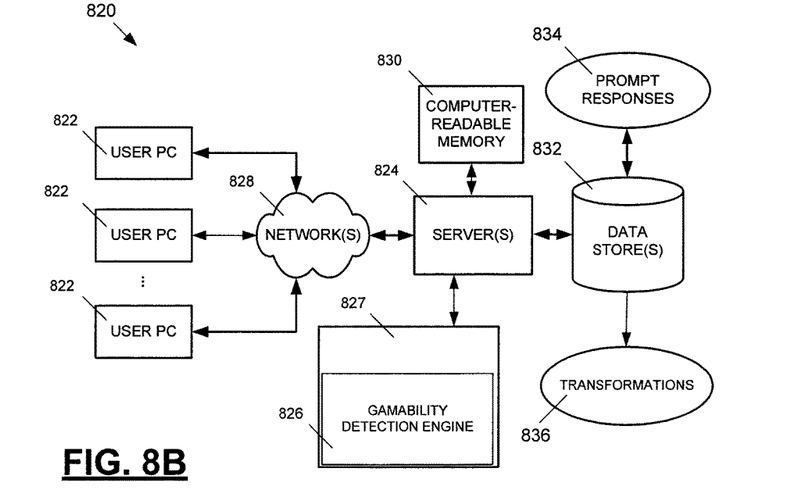
Figure 8C:
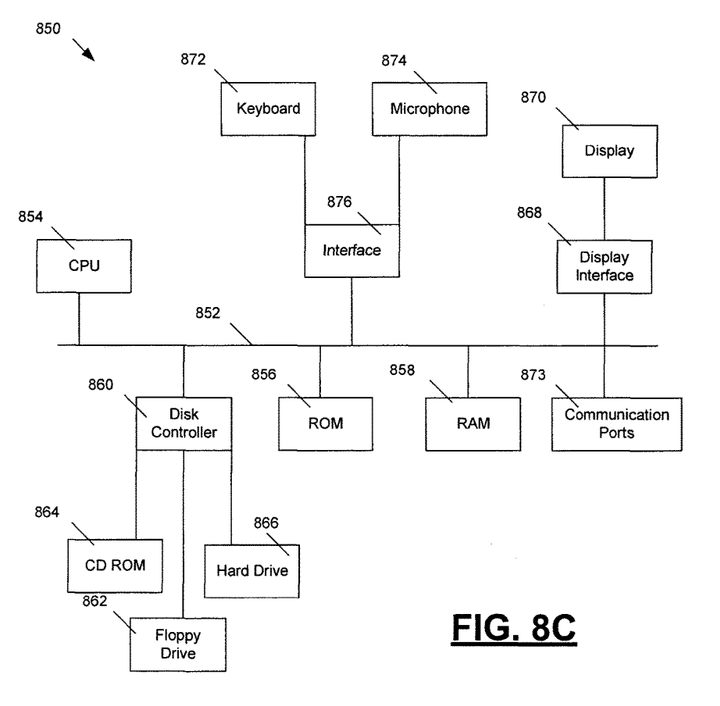

Examples have been used to describe the invention herein, and the scope of the invention may include other examples. FIGS. 8A, 8B, and 8C depict example systems for use in implementing a gaming detection engine. For example, FIG. 8A depicts an exemplary system 800 that includes a standalone computer architecture where a processing system 802 (e.g., one or more computer processors located in a given computer or in multiple computers that may be separate and distinct from one another) includes a gaming detection engine 804 being executed on it. The processing system 802 has access to a computer-readable memory 806 in addition to one or more data stores 808. The one or more data stores 808 may include prompt responses 810 as well as response transformations 812.

FIG. 8B depicts a system 820 that includes a client server architecture. One or more user PCs 822 access one or more servers 824 running a gaming detection engine 826 on a processing system 827 via one or more networks 828. The one or more servers 824 may access a computer readable memory 830 as well as one or more data stores 832. The one or more data stores 832 may contain prompt responses 834 as well as transformations 836.

FIG. 8C shows a block diagram of exemplary hardware for a standalone computer architecture 850, such as the architecture depicted in FIG. 8A that may be used to contain and/or implement the program instructions of system embodiments of the present invention. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 856 and random access memory (RAM) 858, may be in communication with the processing system 854 and may contain one or more programming instructions for performing the method of implementing a gaming detection engine. Optionally, program instructions may be stored on a non-transitory computer readable storage medium such as a magnetic disk, optical disk, recordable memory device, flash memory, or other physical storage medium.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 873.

In addition to the standard computer-type components, the hardware may also include data input devices, such as a keyboard 872, or other input device 874, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for reducing an inflation of a score for a constructed response to a prompt, the method comprising:
   receiving, using a processing system, a plurality of constructed responses to a prompt, the plurality of constructed responses associated with a plurality of test takers;
   generating, using a computer-implemented automated scoring engine, a first set of scores for the plurality of constructed responses;
   selecting, using the processing system, one or more predetermined transformations from a set of transformations to be performed on each of the plurality of constructed responses, the one or more predetermined transformations corresponding to one or more gaming strategies that adjust constructed responses to produce an inflated score;
   generating, using the processing system, a first set of transformed responses based on the selected one or more predetermined transformations and the plurality of constructed responses;
   generating, using the computer-implemented automated scoring engine, a second set of scores for the first set of transformed responses;
   determining, using the processing system, a gaming susceptibility metric based on the first set of scores and the second set of scores, the gaming susceptibility metric indicating that the computer-implemented automated scoring engine is susceptible to the one or more gaming strategies;
   adjusting the computer-implemented automated scoring engine based on the gaming susceptibility metric;
   receiving a live constructed response and providing the live constructed response to the adjusted scoring engine;
   detecting that the live constructed response exhibits at least one of the one or more gaming strategies; and
   lowering the score for the live constructed response using the adjusted computer-implemented automated scoring engine.

2. The method of claim 1, wherein the plurality of constructed responses are essay responses, wherein the prompt requests an essay response, and wherein the gaming susceptibility metric is based on a difference between an average of the second set of scores and an average of the first set of scores.

3. The method of claim 1, wherein the one or more transformations comprise:
   replacing a word in each of the plurality of constructed responses with a synonym, wherein the synonym is less frequently used than the word or the synonym contains more letters than the word, wherein replacing the word comprises:
     identifying a word in one of the plurality of constructed responses as a candidate word;
     identifying synonyms of the candidate word;
     identifying one of the identified synonyms that is less frequently used based on a word frequency reference; and
     replacing the word with the identified one of the identified synonyms.

4. The method of claim 1, wherein the one or more transformations comprise one or more of:
   repeating a constructed response one or more times in a transformed response;
   incorporating one or more words from the prompt into the transformed response; and
   incorporating one or more words from a list into the transformed response.

5. The method of claim 1, further comprising:
   performing a second transformation to each of the plurality of constructed responses to generate a second set of transformed responses;
   providing the second set of transformed responses to the computer-implemented automated scoring engine to receive a third set of scores;
   determining a second gaming susceptibility metric based on the first set of scores and the third set of scores;
   comparing the first gaming susceptibility metric to the second gaming susceptibility metric to determine which of the one or more transformations and the second transformation is more effective at gaming the computer-implemented automated scoring engine, wherein the one or more transformations is determined to be more effective when the second set of scores is higher than the third set of scores.

6. The method of claim 1, further comprising:
repeatedly applying different subsets of the set of transformations to each of the plurality of constructed responses and providing those transformed responses to the computer-implemented automated scoring engine to determine additional sets of scores, wherein all or only a portion of the possible subsets of the set of transformations are applied to each of the plurality of constructed responses, wherein when only a portion of possible subsets of the set of transformations are applied, those portion of the possible subsets are selected for application to each of the plurality of constructed responses based on a heuristic.

7. The method of claim 6, further comprising:
calculating a gamability metric ($\Gamma$) for the computer-implemented automated scoring engine according to the following when all of the possible subsets of the set of transformations are applied:

$$\Gamma = \frac{1}{N} \max_{\{\vec{n},\vec{m}\}} \left\{ \sum_{i=1 \ldots N} \text{Score}[(s_{m_0}^{n_0} \circ s_{m_1}^{n_1} \circ \ldots)(R_i)] \right\} - \frac{1}{N} \sum_{i=1 \ldots N} \text{Score}(R_i);$$

where $R_i$ represents the ith response of the plurality of constructed responses, N represents the number of constructed responses in the plurality of constructed responses, Score is the score provided by the computer-implemented automated scoring engine, and $s_c^B$ is an application of transformation c according to parameter b applied to each of the plurality of constructed responses $R_i$.

8. A computer-implemented system for reducing an inflation of a score for a constructed response to a prompt, the system comprising:
a computer-readable medium encoded with a plurality of constructed responses to a prompt, the plurality of constructed responses associated with a plurality of test takers;
a computer-implemented transformation engine configured to:
select one or more predetermined transformations from a set of transformations to be performed on each of the plurality of constructed responses, the one or more predetermined transformations corresponding to one or more gaming strategies that adjust constructed responses to produce an inflated score;
generate a first set of transformed responses based on the selected one or more predetermined transformations and the plurality of constructed responses;
a computer-implemented automated scoring engine configured to:
receive the plurality of constructed responses and to generate a first set of scores for the plurality of constructed responses;
receive the first set of transformed responses and to generate a second set of scores for the first set of transformed responses;
a computer-implemented score comparison module configured to:
determine a gaming susceptibility metric based on the first set of scores and the second set of scores, the gaming susceptibility metric indicating that the computer-implemented automated scoring engine is susceptible to the one or more gaming strategies;
adjust the computer-implemented automated scoring engine based on the gaming susceptibility metric;
receive a live constructed response and provide the live constructed response to the adjusted scoring engine;
detect that the live constructed response exhibits at least one of the one or more gaming strategies; and
lower the score for the live constructed response using the adjusted computer-implemented automated scoring engine.

9. The system of claim 8, wherein the plurality of constructed responses are essay responses, wherein the prompt requests an essay response, and wherein the gaming susceptibility metric is based on a difference between an average of the second set of scores and an average of the first set of scores.

10. The system of claim 8, wherein the one or more transformations comprise:
replacing a word in each of the plurality of constructed responses with a synonym, wherein the synonym is less frequently used than the word or the synonym contains more letters than the word, wherein replacing the word comprises:
identifying a word in one of the plurality of constructed responses as a candidate word;
identifying synonyms of the candidate word;
identifying one of the identified synonyms that is less frequently used based on a word frequency reference; and
replacing the word with the identified one of the identified synonyms.

11. The system of claim 8, wherein the one or more transformations comprise one or more of:
repeating a constructed response one or more times in a transformed response;
incorporating one or more words from the prompt into the transformed response; and
incorporating one or more words from a list into the transformed response.

12. The system of claim 8, wherein the system is further configured to:
perform a second transformation to each of the plurality of constructed responses to generate a second set of transformed responses;
provide the second set of transformed responses to the computer-implemented automated scoring engine to receive a third set of scores;
determine a second gaming susceptibility metric based on the first set of scores and the third set of scores;
compare the first gaming susceptibility metric to the second gaming susceptibility metric to determine which of the one or more transformations and the second transformation is more effective at gaming the computer-implemented automated scoring engine, wherein the one or more transformations is determined to be more effective when the second set of scores is higher than the third set of scores.

13. The system of claim 8, wherein the system is further configured to:
repeatedly apply different subsets of the set of transformations to each of the plurality of constructed responses and providing those transformed responses to the computer-implemented automated scoring engine to determine additional sets of scores, wherein all or only a portion of the possible subsets of the set of transformations are applied to each of the plurality of constructed responses, wherein when only a portion of possible subsets of the set of transformations are applied, those portion of the possible subsets are selected for application to each of the plurality of constructed responses based on a heuristic.

14. The system of claim 13, wherein the system is further configured to:
calculate a gamability metric ($\Gamma$) for the computer-implemented automated scoring engine according to the following when all of the possible subsets of the set of transformations are applied:

$$\Gamma = \frac{1}{N}\max_{\{\vec{n},\vec{m}\}}\left\{\sum_{i=1\ldots N}\text{Score}[(s_{m_0}^{n_0}\circ s_{m_1}^{n_1}\circ\ldots)(R_i)]\right\} - \frac{1}{N}\sum_{i=1\ldots N}\text{Score}(R_i);$$

where Ri represents the ith response of the plurality of constructed responses, N represents the number of constructed responses in the plurality of constructed responses, Score is the score provided by the computer-implemented automated scoring engine, and $s_c^B$ is an application of transformation c according to parameter b applied to each of the plurality of constructed responses $R_i$.

15. A non-transitory computer-readable medium encoded with instructions for commanding one or more data processors to perform a method for reducing an inflation of a score for a constructed response to a prompt, the method comprising:
receiving a plurality of constructed responses to a prompt, the plurality of constructed responses associated with a plurality of test takers;
generating, using a computer-implemented automated scoring engine, a first set of scores for the plurality of constructed responses;
selecting one or more predetermined transformations from a set of transformations to be performed on each of the plurality of constructed responses, the one or more predetermined transformations corresponding to one or more gaming strategies that adjust constructed responses to produce an inflated score;
generating a first set of transformed responses based on the selected one or more predetermined transformations and the plurality of constructed responses;
generating using the computer-implemented automated scoring engine, a second set of scores for the first set of transformed responses;
determining a gaming susceptibility metric based on the first set of scores and the second set of scores, the gaming susceptibility metric indicating that the computer-implemented automated scoring engine is susceptible to the one or more gaming strategies;
adjusting the computer-implemented automated scoring engine based on the gaming susceptibility metric;
receiving a live constructed response and providing the live constructed response to the adjusted scoring engine;
detecting that the live constructed response exhibits at least one of the one or more gaming strategies; and
lowering the score for the live constructed response using the adjusted computer-implemented automated scoring engine.

16. The non-transitory computer-readable medium of claim 15, wherein the plurality of constructed responses are essay responses, wherein the prompt requests an essay response, and wherein the gaming susceptibility metric is based on a difference between an average of the second set of scores and an average of the first set of scores.

17. The non-transitory computer-readable medium of claim 15, wherein the one or more transformations comprise:
replacing a word in each of the plurality of constructed responses with a synonym, wherein the synonym is less frequently used than the word or the synonym contains more letters than the word, wherein replacing the word comprises:
identifying a word in one of the plurality of constructed responses as a candidate word;
identifying synonyms of the candidate word;
identifying one of the identified synonyms that is less frequently used based on a word frequency reference; and
replacing the word with the identified one of the identified synonyms.

18. The non-transitory computer-readable medium of claim 15, wherein the one or more transformations comprise one or more of:
repeating a constructed response one or more times in a transformed response;
incorporating one or more words from the prompt into the transformed response; and
incorporating one or more words from a list into the transformed response.

19. The non-transitory computer-readable medium of claim 15, wherein the method further comprises:
performing a second transformation to each of the plurality of constructed responses to generate a second set of transformed responses;
providing the second set of transformed responses to the computer-implemented automated scoring engine to receive a third set of scores;
determining a second gaming susceptibility metric based on the first set of scores and the third set of scores;
comparing the first gaming susceptibility metric to the second gaming susceptibility metric to determine which of the one or more transformations and the second transformation is more effective at gaming the computer-implemented automated scoring engine, wherein the one or more transformations is determined to be more effective when the second set of scores is higher than the third set of scores.

20. The non-transitory computer-readable medium of claim 15, wherein the method further comprises:
repeatedly applying different subsets of the set of transformations to each of the plurality of constructed responses and providing those transformed responses to the computer-implemented automated scoring engine to determine additional sets of scores, wherein all or only a portion of the possible subsets of the set of transformations are applied to each of the plurality of constructed responses, wherein when only a portion of possible subsets of the set of transformations are applied, those portion of the possible subsets are selected for application to each of the plurality of constructed responses based on a heuristic.

21. The non-transitory computer-readable medium of claim 20, wherein the method further comprises:
calculating a gamability metric ($\Gamma$) for the computer-implemented automated scoring engine according to the following when all of the possible subsets of the set of transformations are applied:

$$\Gamma = \frac{1}{N} \max_{[\vec{n},\vec{m}]} \left\{ \sum_{i=1\ldots N} \text{Score}[(s_{m_0}^{n_0} \circ s_{m_1}^{n_1} \circ \ldots)(R_i)] \right\} - \frac{1}{N} \sum_{i=1\ldots N} \text{Score}(R_i);$$

where Ri represents the ith response of the plurality of constructed responses, N represents the number of constructed responses in the plurality of constructed responses, Score is the score provided by the computer-implemented automated scoring engine, and $s_c^B$ is an application of transformation c according to parameter b applied to each of the plurality of constructed responses $R_i$.

* * * * *